United States Patent [19]

Herman et al.

[11] Patent Number: 4,745,600

[45] Date of Patent: May 17, 1988

[54] NETWORK COLLISION DETECTION AND AVOIDANCE APPARATUS

[75] Inventors: Alexander Herman, Sharon; Robert L. Smith, Jr., North Easton, both of Mass.

[73] Assignee: Codex Corporation, Mansfield, Mass.

[21] Appl. No.: 851,253

[22] Filed: Apr. 14, 1986

Related U.S. Application Data

[63] Continuation-in-part of Ser. No. 753,183, Jul. 9, 1985, abandoned.

[51] Int. Cl.<sup>4</sup> ............................. H04J 3/16; H04J 3/12
[52] U.S. Cl. .................................... 370/95; 370/110.1; 340/825.5
[58] Field of Search ................. 340/825.5; 370/85, 60, 370/94, 95, 110.1, 89; 455/16, 33, 38

[56] References Cited

U.S. PATENT DOCUMENTS

| | | | |
|---|---|---|---|
| 3,781,803 | 12/1973 | Shear et al. | 340/147 |
| 3,825,829 | 7/1974 | Braun | 325/6 |
| 3,955,140 | 5/1976 | Stephens et al. | 325/4 |
| 3,986,122 | 10/1976 | McManus | 325/42 |
| 4,013,959 | 3/1977 | Patterson | 325/57 |
| 4,063,220 | 12/1977 | Metcalfe et al. | 340/147 |
| 4,135,057 | 1/1979 | Bayless, Sr. et al. | 178/67 |
| 4,259,663 | 3/1981 | Gable | 340/147 |
| 4,295,122 | 10/1981 | Hatada et al. | 340/825.5 |
| 4,335,468 | 6/1982 | Foster et al. | 455/67 |
| 4,380,088 | 4/1983 | Lipcon | 455/67 |
| 4,380,761 | 4/1983 | Boggs | 340/147 |
| 4,384,363 | 5/1983 | Lipcon | 455/58 |
| 4,394,760 | 7/1983 | Kammerlander | 370/111 |
| 4,402,073 | 8/1983 | Hammond | 370/9 |
| 4,409,684 | 10/1983 | Pooch et al. | 375/116 |
| 4,428,061 | 1/1984 | Skinner et al. | 364/728 |
| 4,464,658 | 8/1984 | Thelen | 340/825.5 |
| 4,476,467 | 10/1984 | Terwilliger et al. | 340/825.5 |
| 4,479,228 | 10/1984 | Crane | 375/7 |
| 4,484,353 | 11/1984 | Flottes et al. | 455/33 |
| 4,488,218 | 12/1984 | Grimes | 364/200 |
| 4,491,942 | 1/1985 | Witte et al. | 370/4 |
| 4,610,010 | 9/1986 | Claessen et al. | 370/85 |
| 4,611,334 | 9/1986 | Engel et al. | 455/33 |
| 4,623,886 | 11/1986 | Livingston | 370/85 |
| 4,630,261 | 12/1986 | Irvin | 370/95 |
| 4,644,348 | 2/1987 | Gerety | 370/85 |

*Primary Examiner*—Douglas W. Olms
*Assistant Examiner*—Curtis Kuntz

[57] ABSTRACT

A technique for regulating the transmission of messages initiated simultaneously by a plurality of nodes of a network, in which clock intervals are established for the network, a sequence of digital values is included in each message and is transmitted to the medium at the rate of one digital value per clock interval, the sequences included in messages that are initiated at the same time by more than one node are transmitted in the same sequence of clock intervals, the presence on the medium of a selected digital value during any clock interval in which a node is transmitting a different digital value within the sequence of a message is detected, and the transmission of the message is interrupted by the node upon such detection, without corrupting another node's transmission.

21 Claims, 3 Drawing Sheets

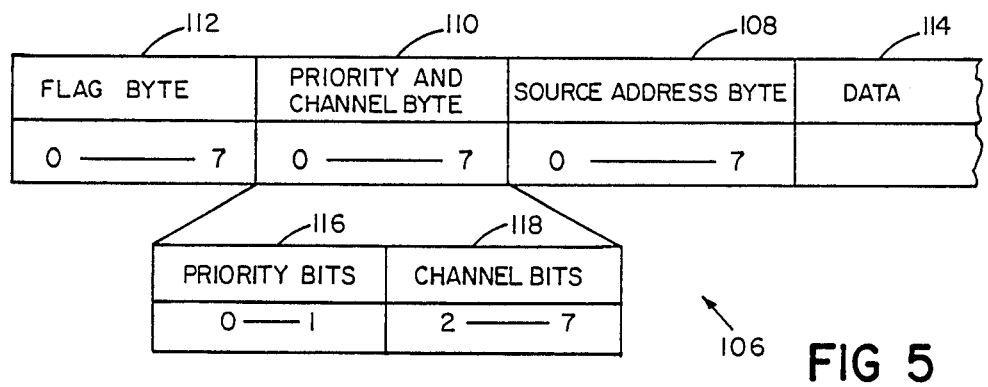

NETWORK COLLISION DETECTION AND AVOIDANCE APPARATUS

BACKGROUND OF THE INVENTION

This invention is a continuation-in-part of U.S. patent Application Ser. No. 753,183, filed July 9, 1985 now abandon.

This invention relates to synchronous digital communications networks in which a number of transceiver nodes communicate with each other over a medium.

Various techniques have been developed for monitoring traffic on such a network and regulating the transmission of messages from the various nodes in such a way as to avoid collisions in the medium.

SUMMARY OF THE INVENTION

A general feature of the invention is a technique for regulating the transmission of messages initiated simultaneously by a plurality of nodes of a network, in which clock intervals are established for the network, a sequence of digital values is included in each message and is transmitted to the medium at the rate of one digital value per clock interval, the sequences included in messages that are initiated at the same time by more than one node are transmitted in the same sequence of clock intervals, the presence on the medium of a selected digital value during any clock interval in which a node is transmitting a different digital value within the sequence of a message is detected, and the transmission of the message is interrupted by the node upon such detection.

Preferred embodiments include the following features. The different digital value is coded as an energy-free clock interval and the selected digital value as an energy-containing clock interval, and each node listens for energy on the medium during each clock interval in which it is transmitting no energy during transmission of a sequence. The messages comprise digital (e.g., binary) values transmitted at the rate of one per clock interval. The sequence is unique (i.e., is a source address of) the node initiating the transmission of the message. The binary values are converted into a format where one binary level is represented by a pulse, during a clock interval, that has a transition of a carrier signal from low to high and then from high to low during some part of the clock interval, and the other binary level is represented by the carrier signal level remaining low during an entire clock interval. The pulse is transmitted as a burst of RF energy, and the transmitter is disabled during clock intervals when the carrier signal level remains low. The clock intervals are derived in each node from messages received from the network, except when the node is attempting to transmit.

Preferred embodiments also include the following features. The sequence of values included in each message are indicative of a predetermined relative priority of the message. At least a portion of the sequence is unique to the node and represents a predetermined relative priority of messages sent by the node. The messages fall into a plurality of categories having different priorities, and the sequence includes two portions, one of which is unique to the node, the second of which is not unique to the node and indicates the priority category of the message. The second portion includes one segment indicative of the priority category of the message, and a second segment indicative of subpriorities of the messages within at least one of the priority categories. The subpriorities are dynamically allocated.

Simultaneously commenced transmissions from more than one node are detected and all but one of the transmissions are aborted without loss of information. Synchronization of all nodes on the network is maintained so long as transmissions occur with sufficient frequency. Prioritization permits efficient use of network bandwidth.

Other advantages and features of the invention will become apparent from the following description of the preferred embodiment, and from the claims.

DESCRIPTION OF THE PREFERRED EMBODIMENT

We first briefly describe the drawings.

DRAWINGS

Figure 1:
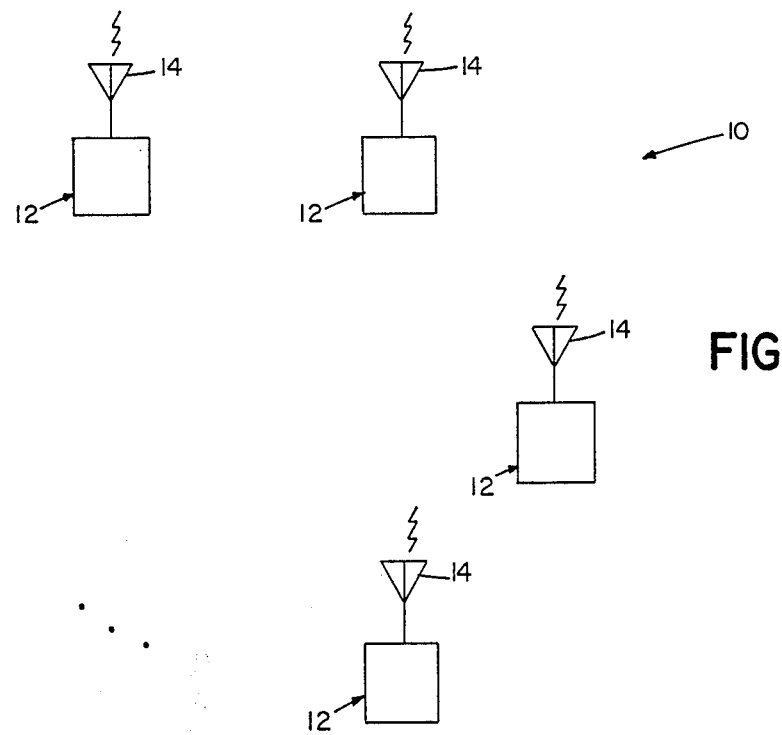
Figure 2:
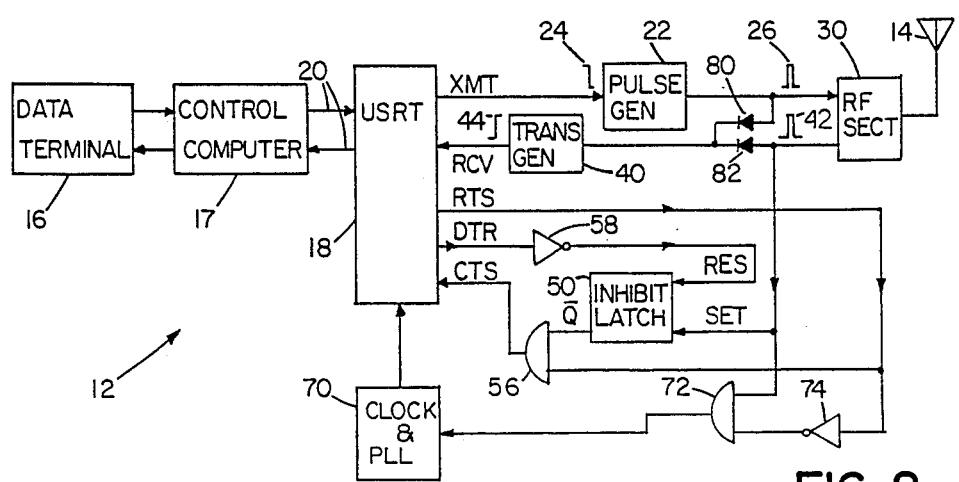
Figure 3:
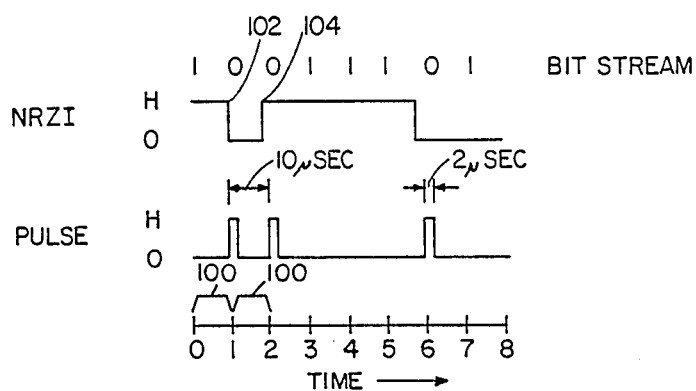
Figure 4:
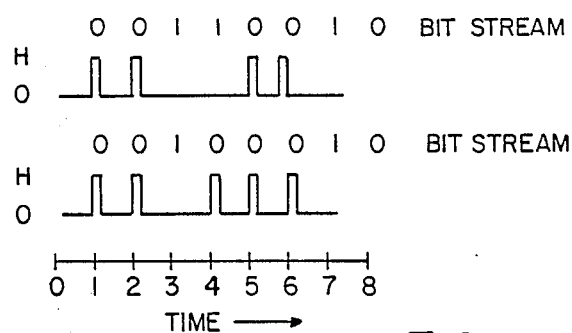

FIG. 1 is a diagram of a communications network.
FIG. 2 is a block diagram of one node of the network.
FIGS. 3 and 4 are timing diagrams relating to the operation of each node.
FIG. 5 is a chart of the bits of a message packet.
FIGS. 6, 7 are examples of preambles of conflicting message packets.

STRUCTURE

Referring to FIG. 1, network 10 consists of a number of transceiver nodes 12, communicating with each other through the radio frequency medium via antennas 14.

Each node 12 has (FIG. 2) a conventional data terminal 16 which transmits messages and instructions via control computer 17 to conventional universal synchronous receiver/transmitter 18 ("USRT", Motorola 6854 ADLC) via system bus 20. USRT 18 transmits the messages (as packets) to antenna 14 through pulse generator 22 (which converts the signal format from non-return-to-zero ("NRZI") transitions 24 to 2 $\mu$sec pulses 26, as described in more detail below) and RF section 30. Signals received by the antenna pass through RF section 30 and transition generator 40 (for format change from pulses 42 to NRZI transitions 44) to USRT 18.

Pulses 42 also set inhibit latch 50, which, when set, keeps one input of AND gate 56 low; AND gate 56 then in turn keeps the clear-to-send ("CTS") input of USRT 18 low, inhibiting transmission from the USRT. The request-to-send ("RTS") output of USRT 18 is connected to the other input of AND gate 56 and, when latch 50 is reset (by the data terminal ready ("DTR") output of USRT 18 through inverter 58), can be asserted to raise CTS.

Clock 70 provides bit intervals defining clock pulses to USRT 18 and includes a phase lock loop for synchronizing the clock to received pulses 42. To that end, pulses 42 feed one input of AND gate 72, the other input of which is connected to RTS through inverter 74; the output of AND gate 72 thus provides a synchronizing pulse train to the phase lock loop except when RTS is high.

Outgoing message pulses are also sent to the receive input ("RCV") of USRT 18 (which remains active while the USRT 18 transmits the first portion of each message) through diode 80 and transition generator 40. Diode 80 prevents received pulses 42 from entering the output of pulse generator 22. Diode 82 prevents transmitted pulses 26 from entering the output of RF section 30.

FIG. 3 shows the relationship between the NRZI and pulse formats. Successive bit intervals (equivalent to clock intervals) 100 are represented on the horizontal TIME axis. In the NRZI format the signal level undergoes a transition from high to low (e.g., at 102) or low to high (e.g., at 104), in any bit interval in which the binary value 0 occurs, and otherwise remains at the same level as in the preceding bit interval. In the pulse format, each NRZI transition, i.e., each binary value zero, is converted (by pulse generator 22) into a 2 μsec wide pulse 26. The absence of a transition in a bit interval, i.e., a binary value one, is represented by the signal level remaining low for a bit interval. Similarly, transition generator 43 converts received pulses 42 (FIG. 2) into NRZI transitions. Pulses 26 and 42 occur at the beginning of their respective bit intervals 100, which are each 10 μsec wide, so that 8 μsec are available for echoes to die out.

Antenna 14 and RF section 30 convert pulses into 2 μsec bursts of RF energy, and vice versa; the absence of a pulse 26, 42 corresponds to no RF energy during a bit interval. In any bit interval in which RF section 30 is not transmitting RF energy its receive portion is enabled to receive any incoming RF pulse that might be on the network; when RF section 30 is transmitting a pulse, its receiver is disabled.

Node 12 is arranged to include in each message packet to be transmitted a preamble that includes a unique 8-bit source address byte, so that each message on the network will have a preamble address unique to the node from which it originated. Two examples of such source addresses are shown in FIG. 4. The source address byte can have any value from 00000001 to 01111111.

Referring to FIG. 5, within the preamble 106, the source address byte 108 is preceded by an eight-bit priority and channel byte 110, which is in turn preceded by a standard eight-bit flag byte 112 (01111110) that indicates the beginning of the message packet. The source address byte 108 is followed by data 114.

Within priority and channel byte 110, the two least significant bits serve as priority bits 116 and the six most significant bits serve as channel bits 118. Note, however, that the least significant bits are actually transmitted first.

The priority bits 116 define the priority of the message according to its content as follows

| Bit 1 | Bit 0 | Definition |
|---|---|---|
| 0 | 0 | Short Virtual Circuit Data Packet |
| 0 | 1 | Long Virtual Circuit Data Packet |
| 1 | 0 | All Virtual Circuit Control Packets |
| 1 | 1 | All Datagram Data and Control Packets |

The priority assignments are not unique to a given node. Higher priority is assigned to messages that are to be carried on so-called virtual circuits that require fast response time, for example, where editor software at a host location must immediately echo back characters entered on a terminal at a user location. Short virtual circuit data packets get the highest priority. Messages (and related control information) to be carried over so-called datagram channels have the lowest priority.

Referring again to FIG. 5, the channel bits 118 define addresses of datagram channels, and can have any value from 000001 to 111111. The address of a datagram channel is assigned at the time a node is connected into the network; the channels are dynamically assigned by software based on channel availability. Note that a datagram channel address is not necessarily unique to a node.

When the priority bits are other than 11, i.e., the message is not a datagram, all of the datagram channel bits are set to 0.

Operation

When data terminal 16 wants to transmit a message it instructs USRT 18 to assert RTS. The assertion of RTS disables the synchronizing mechanism of clock 70 and, if inhibit latch 50 has not been set by the reception of a pulse since the last assertion of DTR (that is, if there is no conflicting transmission already in progress), causes CTS to be asserted. (DTR is asserted momentarily upon the completed reception of a message or after a received pulse is determined to be noise.) In order to reset the inhibit latch. USRT 18 then indicates to data terminal 16 that CTS has been asserted, and data terminal 16 passes the message to USRT 18, which transmits the message, including that node's unique source address and the priority and channel byte 110 to antenna 14. The message, as it leaves the pulse generator, also travels through diode 80 and transition generator 40 to the receive input of USRT 18 where it is recorded in anticipation of a possible message collision. Antenna 14 emits bursts of RF energy corresponding to pulses in the outgoing message.

Assuming that the node just described has the source address shown at the top of FIG. 4, then in transmitting that source address, bursts of energy are emitted during the first two bit intervals. The receiver portion of RF section 30 in that node is disabled during these two bit intervals to prevent the node from receiving its own transmissions. During the third and fourth bit intervals no energy is transmitted and the receiver portion of RF section 30 is enabled, and so on.

If a second node, having the source address shown at the bottom of FIG. 4 (and having a priority and channel byte 110 that is identical to the priority and channel byte of the first node), begins transmitting a message packet simultaneously with the transmission by the first node, the collision is detected as follows.

The pulses transmitted by the second node for (a) those bit intervals of the priority and channel byte that are 0s, and (b) the first two bit intervals of the source address, are not received by the first node because the receiver portion of its RF section 30 is disabled.

During the third bit interval of the source address, neither node transmits a pulse so that although the receiver portion of the first node's RF section is enabled, it detects no energy.

During the fourth bit interval of the source address, only the second node transmits a pulse. The first node's receiver portion, now enabled, detects the burst of RF energy from the second node and emits a pulse 42 which simultaneously sets inhibit latch 50 and is converted to a transition by transition generator 40.

Setting inhibit latch 50 forces CTS low, and USRT 18 in the first node immediately ceases to transmit (while transmission from the second node proceeds). The transition generated by transition generator 40 is also received at the RCV input of USRT 18. Because the first three outgoing pulses from the first node were recorded and because the first three bits of the two source addresses are identical, the USRT now holds all of the first four bits of the source address of the incoming message; thus no information has been lost. USRT 18 continues to receive the incoming message, gathering it in 8-bit bytes and transmitting them to data terminal 16. During reception USRT 18 asserts neither RTS nor DTR. When the message has been completely received, data terminal 16 instructs USRT 18 to momentarily assert DTR, resetting inhibit latch 50. USRT 18 remains in the receiver state. Data terminal 16 then reattempts transmission of the aborted message.

Thus, simultaneously commenced transmissions are detected and one of the transmissions is aborted without loss of information.

An incoming message received while a node is idle is handled the same as one received during an outgoing transmission.

In the case when the priority and channel bytes of two conflicting messages are identical, the source address serves to establish a priority for service as between the conflicting messages. The source address that has the earliest 0 bit in the sequence which is not matched by a 0 bit in the other message's source address is the winner.

In a similar fashion, when the priority and channel bytes of conflicting messages are not identical, they define priorities for service.

For example, referring to FIG. 6, if nodes A, B, C, all begin simultaneous transmission of message packets that include identical priority bits (11) and include the indicated channel bits and source address byte, the priority for service is defined by the channel bits, and node B wins (because it has the earliest 0 bit (120) not matched by a 0 bit in either of the other message packets).

In another example, referring to FIG. 7, where nodes D and E send short virtual circuit packets and node F a long virtual circuit packet, the node F message will be eliminated as lower priority once bit 122 is reached. As between the node D and E messages, the source address will control priority. Node D will win at bit 124.

The priority established by the priority bits improves the efficiency of the use of bandwidth.

When reception of a message is complete, the clock of the receiving node is in phase with the clock of the transmitting node and the receiving USRT is in byte phase with the transmitting USRT. All other nodes in the network are also in clock phase and byte phase because they have all received the same message (but of course have discarded it if not addressed to them). Because all clocks are precision crystals, synchronization of all nodes will continue for a decay period lasting a few bytes. As long as transmissions occur regularly synchronism of all nodes is maintained. The time required to detect simultaneous conflicting transmissions is sufficiently brief so that the drift that occurs at the non-winning nodes is within clock tolerances.

To prevent received pulses that represent only noise from effectively blocking transmission by node 12, when the USRT asserts RTS, it waits to be interrupted either by CTS being asserted or, upon the running of a predetermined time period, by a timeout. If the CTS is asserted, transmission proceeds. If the timeout occurs, then USRT momentarily asserts DTR to reset the inhibit latch and waits further until either a message is received (indicating that another node is transmitting) or a second timeout occurs. The second timeout indicates that the inhibit latch had been set by the receipt of a noise pulse instead of a message pulse. Transmit is retried.

Other embodiments are within the following claims.

We claim:

1. In a synchronous digital data communications network having a multiplicity of nodes each having a transmitter and a receiver for connection to a medium, means for regulating the transmission of messages initiated simultaneously by a plurality of nodes, said means for regulating comprising clock means for determining clock intervals for said network, coding means connected to be responsive to said clock means for including in each message a sequence of digital values and for transmitting to said medium each said sequence at a rate of one digital value per clock interval as determined by said clock means, timing means for causing each said sequence included in each one of a plurality of said messages initiated simultaneously by a plurality of said nodes to be transmitted in the same clock intervals, monitoring means connected to be responsive to said medium for detecting the presence on said medium of a selected digital value during any said clock interval in which a node is transmitting a different digital value within said sequence included in a said message, and collision control means connected to be responsive to said monitoring means for interrupting transmission of said message by said node upon such detection by said monitoring means.

2. The network of claim 1, wherein said coding means codes said different digital value into an energy-free clock interval and codes said selected digital value into an energy-containing clock interval, and said monitoring means causes the receiver of each said node to listen for energy on said medium during each clock interval in which said node is transmitting no energy during transmission of a said sequence.

3. The network of claim 1 wherein said messages comprise a series of digital values where said digital values are transmitted at a rate of one digital value per clock interval.

4. The network of claim 1, wherein said sequence is unique to the node initiating the transmission of each said message.

5. The network of claim 4, wherein said sequence comprises a source address of said initiating node.

6. The network of claim 1, wherein said digital values are binary values.

7. The network of claim 6, wherein said coding means further comprises means for converting said binary values into a format wherein one binary level is represented by a pulse during a said clock interval, said pulse comprising a transition of a carrier signal level from low to high and then from high to low during some part of said clock interval, and the other binary level is represented by said carrier signal level remaining low during an entire clock interval.

8. The network of claim 7, wherein said coding means further comprises means for transmitting said pulse as a burst of RF energy, and means for disabling the transmitter of said transceiver during said clock intervals when said carrier signal level remains low.

9. The network of claim 1, wherein said clock means comprises means in each said node for deriving said clock intervals from messages received from said network, except when said node is attempting to transmit.

10. The network of claim 1 wherein said sequence of digital values included in each said message are indicative of a predetermined relative priority of said message.

11. The network of claim 10 wherein at least a portion of said sequence is unique to said node and represents a predetermined relative priority of messages sent by said node.

12. The network of claim 10 wherein said messages fall into a plurality of categories having different priorities, and said sequence comprises two portions, one portion being unique to said node, the second portion not being unique to said node, said second portion being indicative of the priority category of said message.

13. The network of claim 12 wherein said second portion comprises one segment indicative of said priority category, and a second segment indicative of subpriorities of said messages within at least one of said priority categories.

14. The network of claim 13 wherein said subpriorities are dynamically allocated.

15. A method for regulating the transmission of messages initiated simultaneously by a plurality of nodes in a synchronous digital data communications network that includes a multiplicity of nodes each having a transmitter and a receiver for connection to a medium, comprising the steps of establishing clock intervals for said network, including in each message a sequence of digital values and transmitting to said medium each sequence at a rate of one digital value per clock interval, causing sequences included in a plurality of messages initiated simultaneously by a plurality of nodes to be transmitted in the same sequence of clock intervals, detecting the presence on said medium of a selected digital value any clock interval in which a node is transmitting a different value within said sequence of a message, and interrupting transmission of said message by said node upon said detection.

16. The method of claim 15 wherein said step of including comprises coding said different digital value into an energy-free clock interval, and said selected digital value into an energy containing clock interval, and said step of detecting includes causing the receiver of each of said node to listen for energy on said medium during each clock interval in which said node is transmitted no energy during transmission of a said sequence.

17. The method of claim 15 wherein said step of including comprises causing said sequence of digital values to be indicative of a predetermined relative priority of said message.

18. The network of claim 1 wherein said digital value present on said medium during said clock interval is part of one of said messages transmitted by another said node and said other node is permitted to continue transmitting said message after said collision control means interrupts transmission by said first node.

19. The network of claim 1 wherein said node whose transmission is interrupted is able to receive the entirety of the message with which its own interrupted transmission had collided.

20. The network of claim 1 wherein each said node has an address within said network, and said digital values included in said message correspond to said address.

21. The network of claim 20 wherein each said address is unique within said network.

* * * * *